July 19, 1927.

W. B. GRIFFITH

VALVE

Filed June 19, 1922

1,636,131

INVENTOR
William B. Griffith
BY
F. DeWitt Goodwin
ATTORNEY

Patented July 19, 1927.

1,636,131

UNITED STATES PATENT OFFICE.

WILLIAM B. GRIFFITH, OF PHILADELPHIA, PENNSYLVANIA, ASSIGNOR TO STAR SPRINKLER CORPORATION, A CORPORATION OF NEW JERSEY.

VALVE.

Application filed June 19, 1922. Serial No. 569,349.

My invention relates to improvements in valves, particularly valves adapted for use in sprinkler systems requiring a valve, known as a dry pipe valve, having a water valve and an air valve of larger area than the water valve, whereby a low air pressure confined in the system will hold the water valve closed against a higher water pressure; and when the air pressure is relieved by the opening of a sprinkler head, the valve will open and allow the water to pass through the system. Valves of this general type are well known in the art.

My invention also relates to various improvements and refinements in the arrangement and construction of a valve, over the disclosure made in my application for Letters Patent Serial No. 458,301, filed April 4, 1921, for a dry pipe valve.

The object of my invention is to provide a pivoted valve member having mounted thereon the water clapper valve and the air valve, and provide a clamp ring upon the valve member adapted for securing both the air valve ring and the water clapper valve upon the valve member by which the water valve is freely mounted and retained upon the valve member by the clamp ring extending under the periphery of the water valve, thus limiting the rocking movement of the clapper valve upon the spherical center boss, or bearing member, of the valve member; a further object of my invention is to position the air valve eccentrically in relation to the water valve, whereby the air valve will be located a greater distance from the pivot point, of the valve member than the water valve, by which arrangement the air valve may exert a relatively greater pressure upon the water valve, due to the difference in the leverage between the air valve and the water valve in relation to the shaft on which said valves are pivotally mounted.

Figure 1:
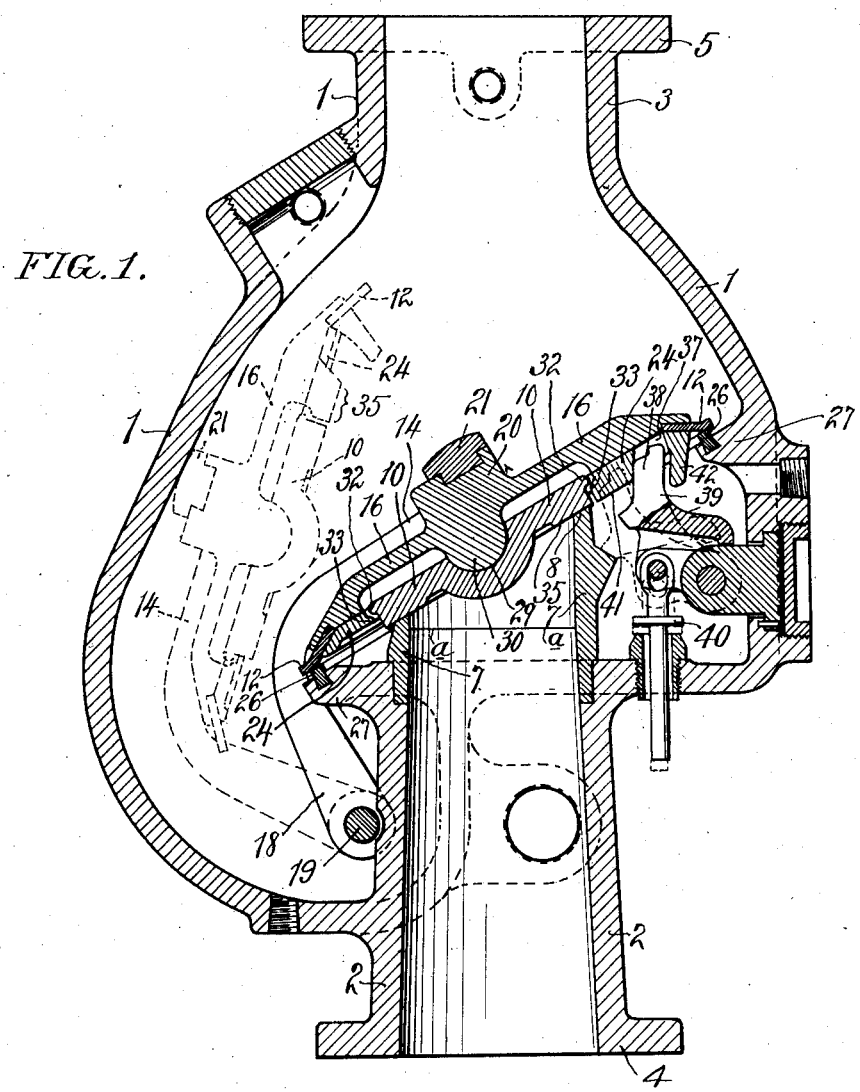
Figure 2:
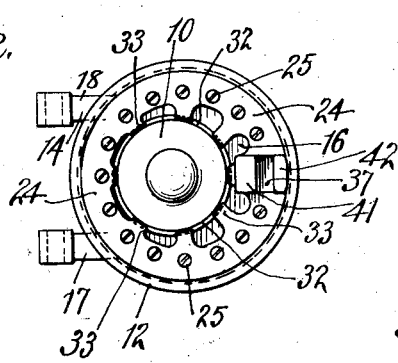

Referring to the accompanying drawing: Fig. 1 is a vertical sectional view of a valve showing my invention embodied therein; Fig. 2 is an inverted plan view of the clapper carrier, detached, showing the water and air valves mounted thereon, and drawn on a smaller scale.

In the accompanying drawings, in which like reference characters refer to like parts, 1 represents the valve body or casing provided with a water inlet pipe 2 and an outlet pipe 3, said pipes having suitable flanges 4 and 5 thereon for making pipe connection.

The inlet pipe 2 extends into the interior of the casing 1, and its inner end is provided with a nozzle 7, having a water valve seat 8 formed thereon, which extends at an oblique angle in relation to the longitudinal axis of the inlet pipe 2. The extreme inner end of the nozzle 7, above the line a—a, is cylindrical to facilitate in machining the parts; below the line a—a the nozzle 7 is conical, as is also the inlet pipe 2 between the nozzle and the flange 4. A Venturi tube is thus formed by the conical formation of the inlet pipe 2 and by the lower conical portion of the nozzle 7, whereby the elliptical opening on the plane of the oblique valve seat 8 may be made equal in area to the area of the opening of the inlet pipe 2 at its larger end, adjacent to the flange 4; thus the water pressure against the valve 10, when seated upon the oblique valve seat 8, is no greater than the pressure would be if the valve 10 were positioned on a plane extending at right angles to the longitudinal axis of the inlet pipe 2, at the plane of the greatest diameter of the inlet pipe. The advantage of the Venturi tube is, that the air valve 12 and the water valve 10, mounted upon the valve member 14 may be positioned obliquely and thus gain a better balancing of the weight of the valves and the valve member 14. Furthermore the water valve 10 and the air valve 12 may be made smaller in area due to the cylindrical portion of the nozzle 7 being smaller in diameter than the diameter of the inlet pipe 2 at its larger end. The valve seat 8 which is elliptical in formation, due to the oblique angle at which it is positioned on the nozzle 7, will not have a greater sectional area than the inlet pipe at its larger end. When the water valve 10 is open, the flow of water will be accelerated as it passes through the Venturi tube, therefore the effective capacity of the water supply pipe is not diminished by the slightly reduced diameter of the nozzle.

The hinged valve member 14 consists of a disk forming an air valve head 16 having formed integrally therewith arms 17 and 18 having portions extending at approximately right angles to the plane of the head 16, which portions are pivotally mounted upon the shaft 19, having its bearing in the housing or casing 1 of the valve.

A boss 20 is formed upon the central portion of the head 16, and is provided with a soft metal bumper block 21, for relieving the arms 17 and 18 of the valve member from strains tending to throw the valve member out of proper alignment when the valve is thrown open against the casing 1.

The head 16 forming part of the valve member, carries the air valve ring 12, preferably of rubber, having its outer edge projecting beyond the periphery of the head 16. The inner edge of the ring 12 is clamped in a groove formed in the under surface of the head 16, by a clamp ring 24, which is secured to the head 16 by fastening devices 25. The air valve ring 12 is adapted to close upon the air valve seat 26 upon a web 27 forming part of the casing 1. The air valve seat 26 is positioned in approximately the same plane as the water valve seat 8 on the nozzle 7.

The water clapper valve 10 is loosely mounted upon the under face of the head 16. The center of the clapper 10 is provided with a spherical depression 29 into which fits a spherical lug 30 formed upon the head 16, which lug 30 forms a rounded bearing part which tends to force the clapper 10 against the valve seat 8. The clapper 10 is provided with an outwardly extending annular flange 32 which is adapted to take against the inwardly extending lugs 33 formed upon the inner edge of the clamp ring 24. Said lugs 33 loosely retain the clapper 10 upon the head 16, permitting the clapper to have a slight rocking movement and also a free rotary movement upon the rounded bearing part 30, whereby the clapper will always close properly upon the water valve seat 8. The facing surface 35, of the clapper 10 is concentric with the boss 30 and it is sufficient in width to cover all parts of the elliptical valve seat 8 regardless of the radial position of the clapper 10.

The air valve seat 26 is positioned eccentrically in relation to the water valve seat 8. The air valve ring 12 and the water clapper valve 10 are correspondingly positioned upon the head 16 of the valve member 14. By this arrangement the center of the water clapper valve 10 is closer to the pivot shaft 19 than is the center of the head 16 carrying the air valve ring 12. When the system contains air under pressure above the head 16 and water pressure below the valve 10, the pivot shaft 19 will act as a fulcrum, and, as the head 16, carrying the air valve ring 12, is located a greater distance from the pivot shaft 19 than the water clapper valve 10, the air valve 12 will have a greater leverage than the water clapper valve 10. The result is that a lower air pressure above the air valve 12 will be required to hold the water valve 10 closed than would be required if the two valves were positioned concentrically; the water pressure below the water valve clapper 10 being constant.

The clamp ring 24 is provided with an opening 37 into which projects an arm 38 of the pivoted latch member 39, adapted to hold the drip valve 40, open, when the valve member 14 is in the closed position. Said ring 24 is also provided with an enlarged boss 41 which rests upon the arm 38 when the projection 42, on the clamp ring 24, forces the arm 38 into the position shown in dotted lines Figure 1. When in the position shown in dotted lines the arm 38 prevents the valves 10 and 26 from reseating.

I claim as my invention:

1. In a valve, a casing provided with an inlet passage, and an outlet passage, a water valve seat surrounding the discharge end of the inlet passage and an air valve seat of larger diameter than the water valve seat surrounding the water valve seat, a valve member pivoted to the casing provided with an air valve head and a bearing part, a valve ring mounted upon the periphery of said head adapted to engage said air valve seat, a valve clapper adapted to engage said water valve seat, said valve clapper having an outwardly extending annular flange upon its periphery and a centrally located socket into which said bearing part extends, a clamp ring secured to said head, said clamp ring positioned upon said head between said valve clapper and said valve ring, said clamp ring having a clamping surface formed upon the outer periphery thereof adapted to engage said valve ring, and said clamp ring having an inner edge portion adapted to loosely engage the periphery of said valve clapper for limiting the movement of the clapper relatively to said head.

2. In a valve, a casing provided with an inlet passage and an outlet passage and having a water-valve seat surrounding the discharge end of the inlet passage and an air-valve seat surrounding the water valve seat, a valve member pivoted to the casing, an air valve upon the valve member adapted to engage said air-valve seat, and a water valve loosely mounted upon the valve member adapted to engage said water-valve seat, said air valve and said water valve positioned in the same or parallel planes, said water valve being positioned eccentrically upon the valve member in relation to said air valve with the center of the water valve nearer to said pivot than the center of the air valve.

3. In a valve, a casing provided with an inlet passage and an outlet passage and having a water-valve seat surrounding the discharge end of the inlet passage and an air-valve seat surrounding the water-valve seat, a valve member pivoted to the casing and provided with an air valve head and a bearing part, a valve ring carried by said head and adapted to engage said air-valve seat, a valve clapper adapted to engage said water-valve seat and having a socket into which said bearing part extends, and means to retain the bearing part within the socket, said air valve and said water valve being positioned in approximately parallel planes, said bearing part and said clapper being eccentric to said valve ring and nearer to the pivot of said member than the center of the valve ring.

4. In a valve, a casing provided with an inlet passage and an outlet passage and having a water-valve seat surrounding the discharge end of the inlet passage and an air-valve seat surrounding the water-valve seat, said valve seats being positioned in approximately the same planes, a valve member pivoted to the casing and provided with a round air-valve head having a valve ring adapted to engage said air-valve seat, and a round valve clapper eccentric to said valve head and having its center nearer to the pivot of said member than the center of said head and being adapted to engage said water-valve seat, said member having a bearing part adapted to engage the central portion of said clapper.

In testimony whereof I affix my signature.

WILLIAM B. GRIFFITH.